United States Patent
Huang (10) Patent No.: US 9,282,498 B2
(45) Date of Patent: Mar. 8, 2016

(54) CELL SWITCHING STRATEGY FOR AN LTE-ADVANCED SYSTEM BASED ON CARRIER AGGREGATION TECHNOLOGY

(75) Inventor: Anpeng Huang, Beijing (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 145 days.

(21) Appl. No.: 13/989,656

(22) PCT Filed: Jul. 24, 2012

(86) PCT No.: PCT/CN2012/079073
§ 371 (c)(1),
(2), (4) Date: May 24, 2013

(87) PCT Pub. No.: WO2014/015474
PCT Pub. Date: Jan. 30, 2014

(65) Prior Publication Data
US 2014/0204777 A1  Jul. 24, 2014

(51) Int. Cl.
*H04W 36/34* (2009.01)
*H04W 24/02* (2009.01)
*H04W 76/06* (2009.01)
*H04W 36/28* (2009.01)

(52) U.S. Cl.
CPC .............. *H04W 36/34* (2013.01); *H04W 24/02* (2013.01); *H04W 36/28* (2013.01); *H04W 76/06* (2013.01)

(58) Field of Classification Search
None
See application file for complete search history.

(56) References Cited

U.S. PATENT DOCUMENTS

2013/0215772 A1*  8/2013  Kaur et al. .................... 370/252
2015/0055621 A1*  2/2015  Koskinen ..................... 370/331

FOREIGN PATENT DOCUMENTS

| EP | 1562388 B1 | 4/2008 |
| WO | 2010126256 A2 | 11/2010 |
| WO | 2011134239 A1 | 11/2011 |
| WO | 2011134360 A1 | 11/2011 |
| WO | 2011142544 A2 | 11/2011 |
| WO | 2011156769 A1 | 12/2011 |
| WO | WO2013143613 | * 10/2013 |

OTHER PUBLICATIONS

International Search Report from International Application No. PCT/CN12/079073 mailed Nov. 15, 2012.
A. Gosh, et al., "LTE-Advanced Wireless Broadband Technology", IEEE Wireless Communications, Jun. 2010.
V. Stencel et al., "LTE Advanced—A further evolutionary step for next generation mobile network", International Conference Radoelektronika, 2010.

(Continued)

*Primary Examiner* — Charles C Jiang
*Assistant Examiner* — George Atkins, Jr.
(74) *Attorney, Agent, or Firm* — Brundidge & Stanger, P.C.

(57) ABSTRACT

Various embodiments of a cell switching strategy for an LTE-Advanced system based on the carrier aggregation technology are provided. Compared with the conventional cell switching strategy, the proposed strategy monitors the channel conditions of all the component carriers that are utilized for the communication of a user. The proposed strategy switches cell for one or more of the component carriers with relatively weaker signal strength while maintaining the cell for the other component carriers with better channel quality.

14 Claims, 6 Drawing Sheets

(56) References Cited

OTHER PUBLICATIONS

G. Yuan, et al., "Carrier Aggregation for LTE—Advanced Mobile Communication Systems", IEEE Commun. Mag., Feb. 2010.

R. Ratasuk, et al., "Carrier Aggregation in LTE-Advanced", Vehicular Technology Conference, 2010.

M. Iwamura, et al., "Carrier Aggregation Framework in 3GPP LTE-Advanced", IEEE Commun. Mag., Aug. 2010.

* cited by examiner

CELL SWITCHING STRATEGY FOR AN LTE-ADVANCED SYSTEM BASED ON CARRIER AGGREGATION TECHNOLOGY

CROSS-REFERENCE TO RELATED APPLICATIONS

This Application is the National Stage filing under 35 U.S.C. §371 of PCT Application Ser. No. PCT/CN2012/079073 filed on Jul. 24, 2012. The disclosure of the PCT Application is hereby incorporated herein by reference in its entirety.

BACKGROUND

The Long Term Evolution Advanced standard, also known as LTE Advanced, LTE-Advanced or LTE-A, is a mobile communication standard adopted by the $3^{rd}$ Generation Partnership Project (3GPP) as a major enhancement of the LTE standard. In an LTE-Advanced system, carrier aggregation technology is used to improve the system's peak rates and support broadband communication up to 100 MHz, so as to ensure that users can transmit data through multiple component carriers and at the same time maintain good compatibility with systems based on the LTE standard.

In a cellular mobile communication system, when a user moves from a first area covered by a cell A associated with a first base station to a second area covered by a cell B associated with a second base station, cell switching (also known as "handover" or "handoff") is required to ensure the strength of the signal received by the user is maintained above a minimum acceptable level. Conventional cell switching strategies, which determine when cell switching occurs for a given user, are generally based on the received power and set a switching threshold slightly higher than the minimum acceptable signal strength. This way, the conventional strategies ensure that the cell switching is completed before the weakened signal interrupts the communication while unnecessary switching is avoided.

However, there is an issue with the conventional cell switching strategies as the basis for judging whether a user switches from one cell to another at a given point in time is the strength of the signal received by the user. In the context of carrier aggregation, path loss, shadow fading and a small scale of facing on the different component carriers are different for the various component carriers utilized based on the LTE-Advanced standard. This leads to significant differences among the signal strengths of different component carriers. Consequently, cell switching based on the total signal strength received by the user according to conventional cell switching strategies would be impractical if not impossible when carrier aggregation is implemented.

SUMMARY

Described herein are systems, apparatuses, methods, and techniques related to cell switching for an LTE-Advanced system based on the carrier aggregation technology. In at least one aspect, a method may monitor channel conditions of a first component carrier and a second component carrier of a first wireless communication cell that are utilized by a communication device as a primary component carrier and a secondary component carrier, respectively, in carrier aggregation. The method may further release one of the first and second component carriers from being utilized by the communication device while maintaining utilization of the other of the first and second component carriers by the communication device in response to a channel condition of the one of the first and second component carriers being less than a channel condition of a corresponding component carrier of a second wireless communication cell.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are explicitly contemplated herein.

Described herein are techniques related to cell switching for an LTE-Advanced system based on the carrier aggregation technology. The implementations of cell switching described herein include monitoring channel conditions of all the component carriers that are utilized for the communication of a user. The cell switching strategy calls for switching cell for one or more of the component carriers with relatively weaker signal strength while maintaining the cell for the other component carriers with better channel quality. Further, the cell switching strategy addresses handover issue by monitoring channel conditions. More specifically, the handover of each component carriers is carried out individually, considering frequency selective fading. That is, the cell switching strategy takes into account the critical role that frequency selective fading plays in wireless networks, and therefore executes a handover procedure individually for component carriers in carrier aggregation.

Overview

Figure 1:
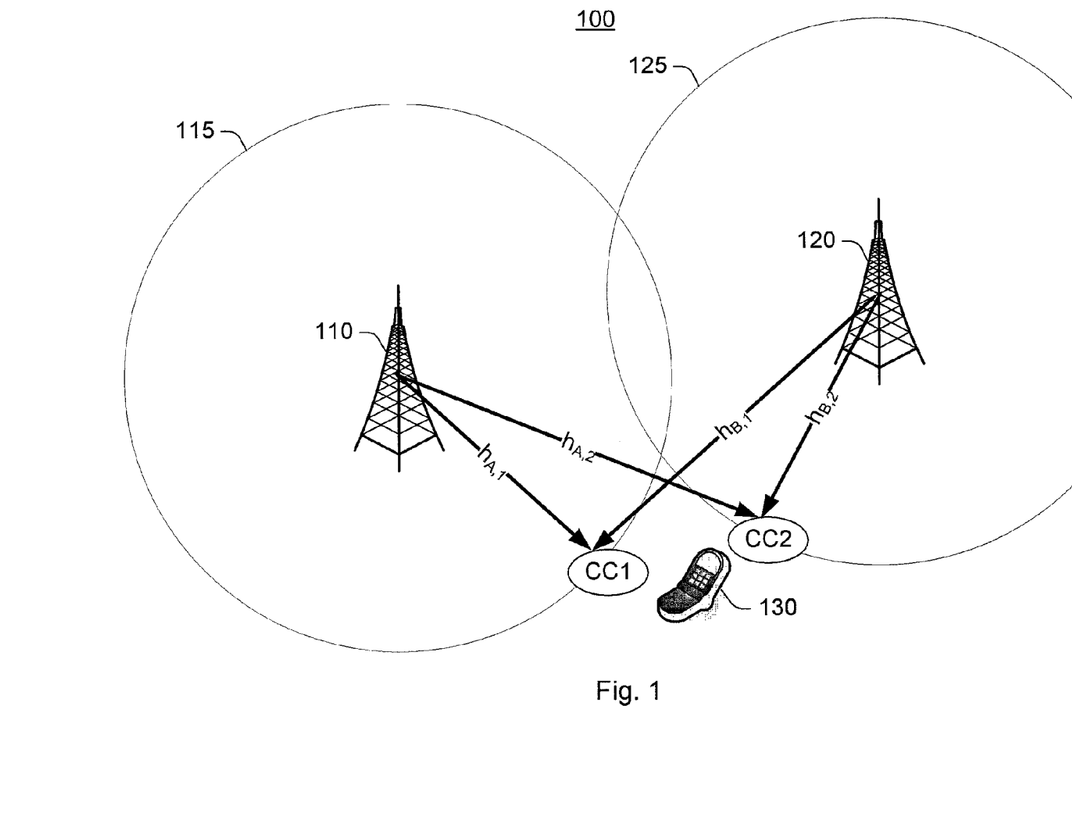
FIG. 1 shows an example cellular mobile communication system that implements one or more embodiments of a cell switching strategy for an LTE-Advanced system based on the carrier aggregation technology.

FIG. 1 shows an example cellular mobile communication system 100 for implementing a cell switching strategy for an LTE-Advanced system based on the carrier aggregation technology in accordance with the present disclosure.

System 100 includes a first base station 110, a cell A 115 associated with the first base station 110, a second base station 120, a cell B 125 associated with the second base station 120, and an LTE-Advanced user equipment 130. Hereafter, the terms "user" and "user equipment" may be used interchangeably.

According to the LTE-Advanced standard, a component carrier is categorized as either a primary component carrier (PCC) or a secondary component carrier (SCC). For a given user in an LTE-Advanced system that implements the carrier aggregation technology, one of the aggregated component carriers is the PCC for the user while the other ones of the aggregated component carriers are SCCs. The embodiments of cell switching strategy described herein call for monitoring system information on the PCC at all times and for scheduling the PCC and the SCCs simultaneously.

For illustrative purposes only, in the system 100 of FIG. 1, component carrier 1 (CC1) is the PCC and component carrier 2 (CC2) is the SCC. User 130 transmits data on both CC1 and CC2 simultaneously. In the example, user equipment 130 originally communicates with the cell A 115 on both CC1 and CC2, while moving away from the cell A 115 and toward the cell B 125. As user equipment 130 moves to the cell edge of cell A 115 as well as to the cell edge of cell B 125, the cell switching strategy calls for judging whether and when to switch cells, e.g., from cell A 115 to cell B 125, for user equipment 130. The channel condition of CC1 from the cell A 115 to user equipment 130 is denoted as $h_{A,1}$ and the channel condition of CC2 from the cell A 115 to user equipment 130 is denoted as $h_{A,2}$. Similarly, the channel condition of CC1 from the cell B 125 to user equipment 130 is denoted as $h_{B,1}$ and the channel condition of CC2 from the cell B 125 to user equipment 130 is denoted as $h_{B,2}$. Although there may be one or more additional component carriers in each of the cell A 115 and cell B 125 such that there are more than one SCC in either or both of the cell A 115 and cell B 125, and the present description is directed to two component carriers, CC1 and CC2, with respect to the cell A 115 and cell B 125, those skilled in the art would appreciate that the disclosed embodiments may be applied in cases for which there is more than one SCC in the cells. Hereafter, the term "channel condition" refers to the condition of the communication medium, through which a signal propagates from a transmitter to a receiver, which is subject to the combined effect of, for example, scattering, fading and power decay with distance.

As user equipment 130 continues to move generally away from cell A 115 and toward cell B 125, channel conditions of CC1 and CC2 with respect to cell A 115 and cell B 125 change accordingly. Eventually, at least one of the channel condition of CC1 from cell A 115 to user equipment 130, $h_{A,1}$, and channel condition of CC2 from cell A 115 to user equipment 130, $h_{A,2}$, will deteriorate to a point where it is worse than the respective channel condition CC1 and/or CC2 from cell B 125 to user equipment 130, $h_{B,1}$ and $H_{B,2}$, respectively. For example, there may come a point in time when the channel condition CC1 from cell A 115 to user equipment 130 is worse than the channel condition CC1 from cell B 125 to user equipment 130, denoted as $|h_{A,1}|<|h_{B,1}|$, while the channel condition CC2 from cell A 115 to user equipment 130 is still greater than the channel condition CC2 from cell B 125 to user equipment 130, denoted as $|h_{A,2}|<|h_{B,2}|$. According to the cell switching strategy of the present disclosure, user equipment 130 maintains the data transmission with cell A 115 on CC2 and switches CC1 to cell B 125. That is, user equipment 130 communicates with cell A 115 on CC2 and with cell B 125 on CC1 simultaneously. Accordingly, certain gains can be achieved in terms of system performance. More specifically, from the perspective of the cell A 115, CC2 is the PCC for user equipment 130 and, from the perspective of the cell B 125, CC1 is the PCC for user equipment 130. The cell switching strategy according to the present disclosure monitors the system information of the cell A 115 and the cell B 125 on CC1 and CC2, respectively.

Continuing with the above example, as user equipment 130 continues to move away from the cell A 115 and toward the cell B 125, the channel conditions may eventually reach a point at which the channel condition CC1 from cell A 115 to user equipment 130 is worse than the channel condition CC1 from cell B 125 to user equipment 130, denoted as $|h_{A,1}|<|h_{B,1}|$, while the channel condition CC2 from cell A 115 to user equipment 130 is also worse than the channel condition CC2 from cell B 125 to user equipment 130, denoted as $|h_{A,2}|<|h_{B,2}|$. At this time the cell switching strategy according to the present disclosure switches CC2 to the cell B 125. In other words, at this time user equipment 130 communicates with the cell B 125 on both CC1 and CC2, with CC2 serving as the PCC and CC1 serving as the SCC.

Techniques and benefits associated with the cell switching strategy will now be described. When an LTE-Advanced user (e.g., user equipment 130) moves to the cell edge of the original base station (e.g., base station 110 in the above example) and/or the cell edge of neighboring base station (e.g., base station 120 in the above example), the channel conditions of all the component carriers provided by both base stations and utilized by the user are measured. For component carriers 1, 2, 3, . . . , k, the channel conditions of the component carriers of the original base station are denoted as $h_{A,1}, h_{A,2}, h_{A,3}, \ldots h_{A,k}$, and the channel conditions of the component carriers of the neighboring base station are denoted as $h_{B,1}, h_{B,2}, h_{B,3}, \ldots h_{B,k}$. The channel conditions of all the component carriers of the two base stations are compared. According to information theory, for component carrier i, if $|h_{A,i}|>|h_{B,i}|$, then the user does not switch on the component carrier i from cell A to cell B. Otherwise, if $|h_{A,i}|<|h_{B,i}|$, then the user switches on the component carrier i from cell A to cell B.

Through high-level processing, $n_A$ component carriers continue to communicate with the original cell (e.g., cell A 115), for which the numbers of the component carriers are $a_1$, $a_2, \ldots a_{n_A}$, and $n_B$ component carriers switch to the neighboring cell (e.g., cell B 125), for which the numbers of the component carriers are $b_1, b_2, \ldots b_{n_B}$. At this time the system capacity can be expressed as $$\sum_{i=1}^{n_A} B_{a_{n_A}} \log_2\left(1 + \frac{S}{N}|h_{a,a_{n_A}}|\right) + \sum_{i=1}^{n_B} B_{b_{n_B}} \log_2\left(1 + \frac{S}{N}|h_{b,b_{n_B}}|\right),$$

where $B_i$ is the bandwidth of the $i^{th}$ component carrier.

Advantageously, with the cell switching strategy according to the present disclosure, the neighboring cell and the original cell can transmit signals on the component carriers $n_B$ and $n_A$, respectively. Consequently, more signal transmission power may be allocated for each component carrier so as to enhance the performance for users at the cell edge.

In terms of signal transmission power, under the cell switching strategy according to the present disclosure $n_A$ component carriers continue to communicate with the original cell and $n_B$ component carriers switch to the neighboring cell. Accordingly, the signal transmission power of each component carrier is $P_{total}/n_A$ for component carriers communicating with the original cell and $P_{total}/n_B$ for component carriers switched to the neighboring cell, respectively. That is, the system capacity can be expressed as $$\sum_{i=1}^{n_A} B_{a_{n_A}} \log_2\left(1 + \frac{P_{total}}{Nn_A}|h_{a,a_{n_A}}|\right) + \sum_{i=1}^{n_B} B_{b_{n_B}} \log_2\left(1 + \frac{P_{total}}{Nn_B}|h_{b,b_{n_B}}|\right).$$

In other words, the cell switching strategy according to the present disclosure of the present disclosure would render significant performance improvement compared to existing approaches.

Exemplary Processes

Figure 2:
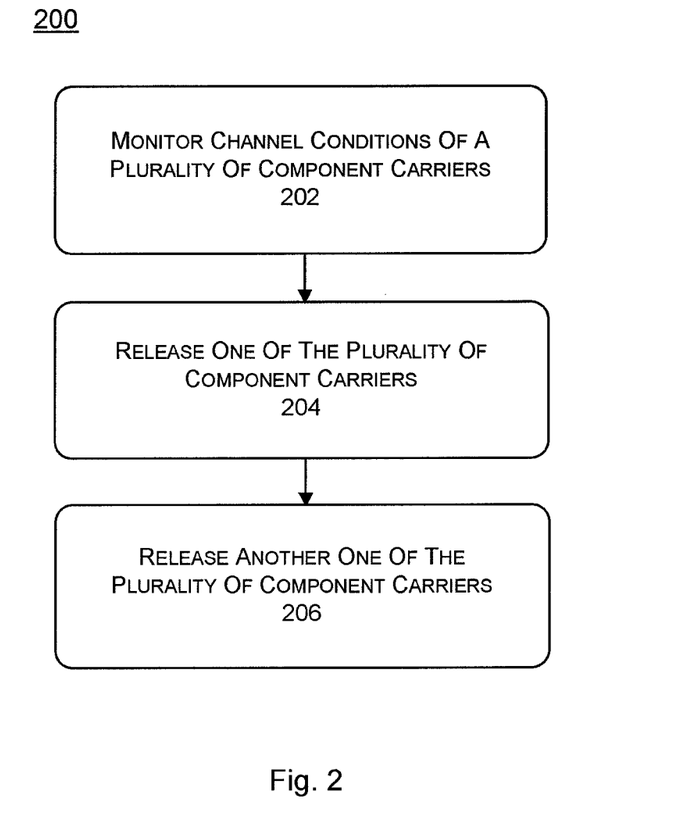
FIG. 2 shows a processing flow in accordance with one or more embodiments of a cell switching strategy for an LTE-Advanced system based on the carrier aggregation technology.

FIG. 2 shows a processing flow 200 in accordance with one or more embodiments of a cell switching strategy for an LTE-Advanced system based on the carrier aggregation technology.

Figure 6:
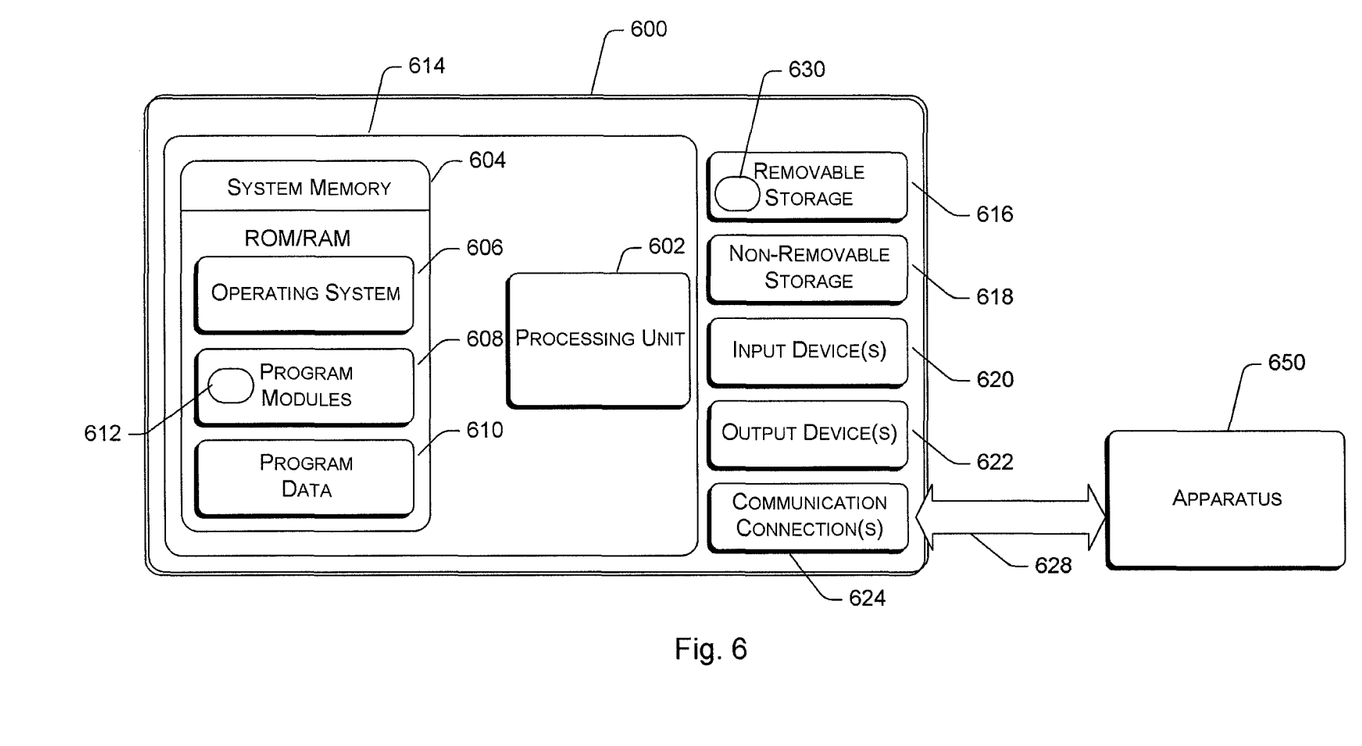
FIG. 6 shows an example computing device that is configured to implement operations of one or more embodiments of a cell switching strategy for an LTE-Advanced system based on the carrier aggregation technology.

Example processing flow 200 includes one or more operations, actions, or functions as illustrated by one or more of blocks 202, 204 and 206. Although illustrated as discrete blocks, various blocks may be divided into additional blocks, combined into fewer blocks, or eliminated, depending on the desired implementation. Further, processing flow 200 may be implemented in the first base station 110, the second base station 120, a central office associated with the first base station 110 and the second base station 120, and/or an example computing device 600, to be described below. Processing flow 200 may begin at block 202.

Block 202 (Monitor Channel Conditions Of A Plurality Of Component Carriers) includes monitoring channel conditions of a first component carrier and a second component carrier of a first wireless communication cell that are utilized by a communication device as a primary component carrier and a secondary component carrier, respectively, in carrier aggregation. For example, the first base station 110 monitors channel conditions of CC1 and CC2 of cell A 115, as CC1 and CC2 are utilized by user equipment 130 as the PCC and SCC, respectively.

Block 204 (Release One Of The Plurality Of Component Carriers) includes releasing one of the first and second component carriers from being utilized by the communication device while maintaining utilization of the other of the first and second component carriers by the communication device in response to a channel condition of the one of the first and second component carriers being less than a channel condition of a corresponding component carrier of a second wireless communication cell. For example, the first base station 110 releases CC1 of cell A 115 from being utilized by user equipment 130 while maintaining utilization of CC2 of cell A 115 by user equipment 130 in response to the channel condition of CC1 of cell A 115 being less than the channel condition of CC1 of cell B 125.

In at least some embodiments, the operation of releasing one of the first and second component carriers from being utilized by the communication device while maintaining utilization of the other of the first and second component carriers by the communication device includes: (1) releasing the first component carrier from being utilized by the communication device while maintaining utilization of the second component carrier by the communication device in response to a channel condition of the first component carrier of the first wireless communication cell being less than a channel condition of a first component carrier of the second wireless communication cell; and (2) allocating the second component carrier as the primary component carrier for the communication device with respect to the first wireless communication cell. For example, after releasing CC1 of cell A 115 from being utilized by user equipment 130 in response to the channel condition of CC1 of cell A 115 being less than the channel condition of CC1 of cell B 125, the first base station 110 may allocate CC2 as the PCC for user equipment 130 with respect to cell A 115.

In at least some embodiments, the first component carrier of the second wireless communication cell may be allocated as the primary component carrier for the communication device with respect to the second wireless communication cell. For example, the second base station 120 may allocate CC1 of cell B 125 as the PCC for user equipment 130 with respect to cell B 125.

In at least some embodiments, the operation of releasing one of the first and second component carriers from being utilized by the communication device while maintaining utilization of the other of the first and second component carriers by the communication device includes: (1) releasing the second component carrier from being utilized by the communication device while maintaining utilization of the first component carrier by the communication device in response to a channel condition of the second component carrier of the first wireless communication cell being less than a channel condition of a second component carrier of the second wireless communication cell; and (2) maintaining the first component carrier as the primary component carrier for the communication device with respect to the first wireless communication cell. For example, the first base station 110 may release CC2 of cell A 115 from being utilized by user equipment 130 while maintaining utilization of CC1 of cell A 115 by user equipment 130 in response to the channel condition of CC2 of cell A 115 being less than the channel condition of CC2 of cell B 125.

In at least some embodiments, the second component carrier of the second wireless communication cell may be allocated as the primary component carrier for the communication device with respect to the second wireless communication cell. For example, the second base station 120 may allocate CC2 of cell B 125 as the PCC for user equipment 130 with respect to cell B 125.

In at least some embodiments, Block 206 (Release Another One of the Plurality of Component Carriers) includes releasing the other of the first and second component carriers from being utilized by the communication device in response to a channel condition of the other of the first and second component carriers being less than a channel condition of another corresponding component carrier of the second wireless communication cell. For example, after releasing CC1 of cell A 115 from being utilized by user equipment 130 in response to the channel condition of CC1 of cell A 115 being less than the channel condition of CC1 of cell B 125, the first base station 110 releases CC2 of cell A 115 from being utilized by user equipment 130 in response to the channel condition of CC2 of cell A 115 being less than the channel condition of CC2 of cell B 125.

Figure 3:
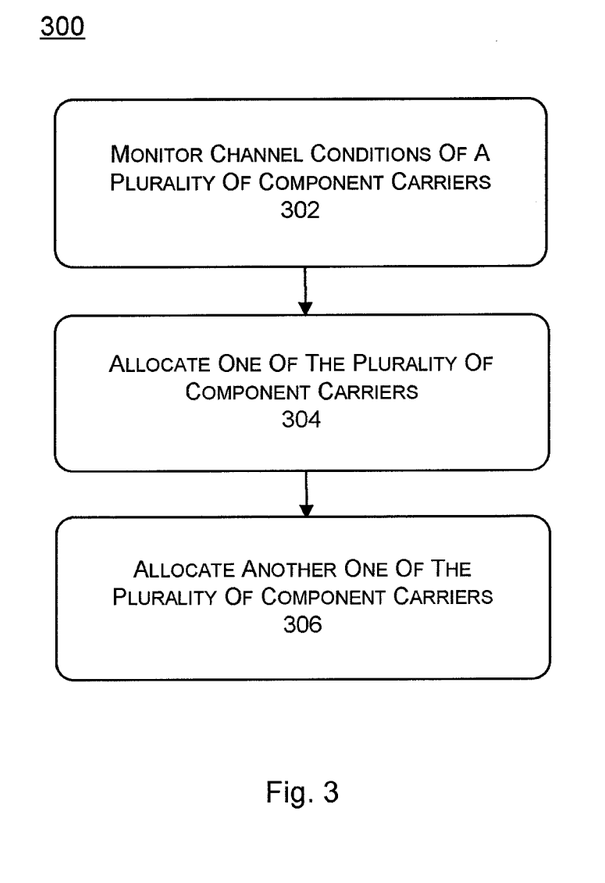
FIG. 3 shows another processing flow in accordance with one or more embodiments of a cell switching strategy for an LTE-Advanced system based on the carrier aggregation technology.

FIG. 3 shows a processing flow 300 in accordance with one or more embodiments of a cell switching strategy for an LTE-Advanced system based on the carrier aggregation technology.

Example processing flow 300 includes one or more operations, actions, or functions as illustrated by one or more of blocks 302, 304 and 306. Although illustrated as discrete blocks, various blocks may be divided into additional blocks, combined into fewer blocks, or eliminated, depending on the desired implementation. Further, processing flow 300 may be implemented in the first base station 110, the second base station 120, a central office associated with the first base station 110 and the second base station 120, and/or the example computing device 600. Processing flow 300 may begin at block 302.

Block 302 (Monitor Channel Conditions Of A Plurality Of Component Carriers) includes 1 monitoring channel conditions of a plurality of component carriers of a first wireless communication cell that are not utilized by a communication device. For example, the second base station 120 monitors the channel conditions of CC1 and CC2, of cell B 125, that are not utilized by user equipment 130 when user equipment 130 is not yet within the coverage range of cell B 125.

Block 304 (Allocate One Of The Plurality Of Component Carriers) includes allocating a first component carrier of the plurality of component carriers of the first wireless communication cell for utilization by the communication device as a first component carrier of a second wireless communication cell is released from being utilized by the communication device in response to a channel condition of the first component carrier of the plurality of component carriers being greater than a channel condition of the first component carrier of the second wireless communication cell. For example, the second base station 120 allocates CC1 of cell B 125 to be utilized by user equipment 130 in response to the channel condition of CC1 of cell B 125 being greater than the channel condition of CC1 of cell A 115.

In at least some embodiments, the operation of allocating the first component carrier of the plurality of component carriers of the first wireless communication cell for utilization by the communication device includes allocating the first component carrier of the plurality of component carriers of the first wireless communication cell as a primary component carrier for utilization by the communication device with respect to the first wireless communication cell. For example, the second base station 120 allocates CC1 to be the PCC with respect to cell B 125 when allocating CC1 of cell B 125 to be utilized by user equipment 130.

In at least some embodiments, Block 306 (Allocate Another One of the Plurality of Component Carriers) includes allocating a second component carrier of the plurality of component carriers of the first wireless communication cell for utilization by the communication device as a second component carrier of the second wireless communication cell is released from being utilized by the communication device in response to a channel condition of the second component carrier of the plurality of component carriers being greater than a channel condition of the second component carrier of the second wireless communication cell. For example, after allocating CC1 of cell B 125 to be utilized by user equipment 130 in response to the channel condition of CC1 of B 125 being greater than the channel condition of CC1 of cell B 115, the second base station 120 further allocates CC2 of cell B 125 to be utilized by user equipment 130 in response to the channel condition of CC2 of cell B 125 being greater than the channel condition of CC2 of cell A 115.

In at least some embodiments, the operation of allocating the second component carrier of the plurality of component carriers of the first wireless communication cell for utilization by the communication device includes allocating the second component carrier of the plurality of component carriers of the first wireless communication cell as a secondary component carrier for utilization by the communication device with respect to the first wireless communication cell. For example, the second base station 120 allocates CC2 to be the SCC with respect to cell B 125 when allocating CC2 of cell B 125 to be utilized by user equipment 130.

Figure 4:
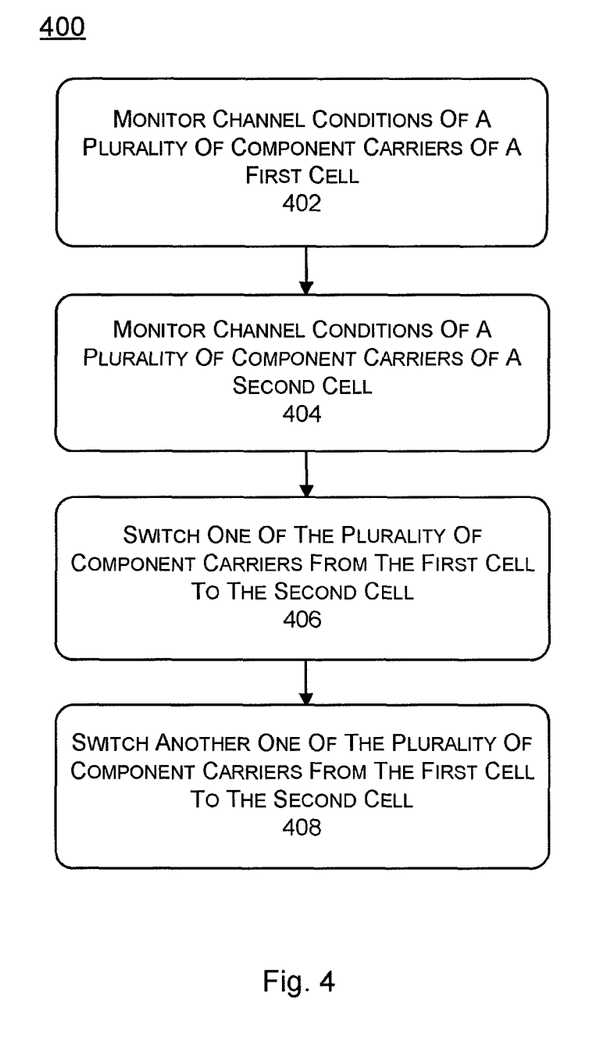
FIG. 4 shows yet another processing flow in accordance with one or more embodiments of a cell switching strategy for an LTE-Advanced system based on the carrier aggregation technology.

FIG. 4 shows a processing flow 400 in accordance with one or more embodiments of a cell switching strategy for an LTE-Advanced system based on the carrier aggregation technology.

Example processing flow 400 includes one or more operations, actions, or functions as illustrated by one or more of blocks 402, 404, 406 and 408. Although illustrated as discrete blocks, various blocks may be divided into additional blocks, combined into fewer blocks, or eliminated, depending on the desired implementation. Further, processing flow 400 may be implemented in the first base station 110, the second base station 120, a central office associated with the first base station 110 and the second base station 120, and/or the example computing device 600. Processing flow 400 may begin at block 402.

Block 402 (Monitor Channel Conditions Of A Plurality Of Component Carriers Of A First Cell) includes monitoring channel conditions of a plurality of component carriers of a first wireless communication cell, where a first component carrier of the plurality of component carriers is utilized by a communication device as a primary component carrier and a second component carrier of the plurality of component carriers is utilized by the communication device as a secondary component carrier. For example, the first base station 110 monitors the channel conditions of CC1 and CC2 of cell A 115 when CC1 is utilized by user equipment 130 as the PCC and CC2 is utilized by user equipment 130 as the SCC with respect to cell A 115.

Block 404 (Monitor Channel Conditions Of A Plurality Of Component Carriers Of A Second Cell) includes monitoring channel conditions of a plurality of component carriers of a second wireless communication cell. For example, the second base station 120 monitors the channel conditions of CC1 and CC2 of cell B 125.

Block 406 (Switch One of the Plurality of Component Carriers From The First Cell To The Second Cell) includes switching from one of the first and second component carriers of the first wireless communication cell to a corresponding one of the plurality of component carriers of the second wireless communication cell while maintaining utilization of the other of the first and second component carriers of the first wireless communication cell by the communication device. This is carried out, for example, in response to a channel condition of the one of the first and second component carriers of the first wireless communication cell being less than a channel condition of the corresponding one of the plurality of component carriers of the second wireless communication cell. For example, user equipment 130 may switch from utilizing CC1 of cell A 115 to CC1 of cell B 125 while maintaining utilization of CC2 of cell A 115 in response to the channel condition of CC1 of cell A 115 being less than the channel condition of CC1 of cell B 125.

In at least some embodiments, the operation of switching includes: (1) releasing the first component carrier from being utilized by the communication device while maintaining utilization of the second component carrier by the communication device in response to a channel condition of the first component carrier of the first wireless communication cell being less than a channel condition of a first component carrier of the second wireless communication cell; and (2) allocating the second component carrier as a primary component carrier for the communication device with respect to the first wireless communication cell. For example, the first base station 110 releases CC1 of cell A 115 from being utilized by user equipment 130 while maintaining utilization of CC2 of cell A 115 by user equipment 130 in response to the channel condition of CC1 of cell A 115 being less than the channel condition of CC1 of cell B 125. Additionally, the first base station 110 allocates CC2 of cell A 115 as the PCC for user equipment 130 with respect to cell A 115. In at least some embodiments, processing flow 400 further allocates the first component carrier of the second wireless communication cell as a primary component carrier for the communication device with respect to the second wireless communication cell. For example, the second base station 120 allocates CC1 of cell B 125 as the PCC for user equipment 130 with respect to cell B 125.

In at least some other embodiments, the operation of switching includes: (1) releasing the second component carrier from being utilized by the communication device while maintaining utilization of the first component carrier by the communication device in response to a channel condition of the second component carrier of the first wireless communication cell being less than a channel condition of a second component carrier of the second wireless communication cell; and (2) maintaining the first component carrier as the primary component carrier for the communication device with respect to the first wireless communication cell. For example, the first base station 110 releases CC2 of cell A 115 from being utilized by user equipment 130 while maintaining utilization of CC1 of cell A 115 by user equipment 130 in response to the channel condition of CC2 of cell A 115 being less than the channel condition of CC2 of cell B 125. Additionally, the first base station 110 maintains CC1 of cell A 115 as the PCC for user equipment 130 with respect to cell A 115. In at least some embodiments, processing flow 400 further allocates the second component carrier of the second wireless communication cell as a primary component carrier for the communication device with respect to the second wireless communication cell. For example, the second base station 120 allocates CC2 of cell B 125 as the PCC for user equipment 130 with respect to cell B 125.

In at least some embodiments, Block 408 (Switch Another One of the Plurality of Component Carriers From The First Cell To The Second Cell) includes further switching from the other of the first and second component carriers of the first wireless communication cell to a corresponding one of the plurality of component carriers of the second wireless communication in response to a channel condition of the other of the first and second component carriers of the first wireless communication cell being less than a channel condition of the corresponding one of the plurality of component carriers of the second wireless communication cell. For example, user equipment 130 switches from utilizing CC1 of cell A 115 to CC1 of cell B 125 while maintaining utilization of CC2 of cell A 115 in response to the channel condition of CC1 of cell A 115 being less than the channel condition of CC1 of cell B 125.

Figure 5:
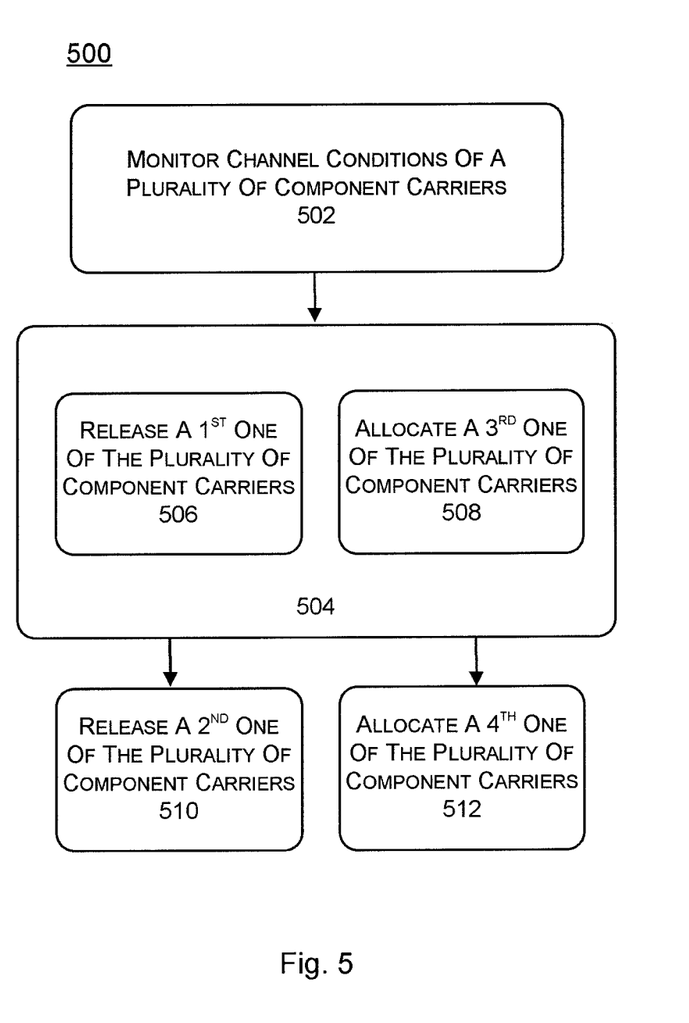
FIG. 5 shows a further processing flow in accordance with one or more embodiments of a cell switching strategy for an LTE-Advanced system based on the carrier aggregation technology.

FIG. 5 shows a processing flow 500 in accordance with one or more embodiments of a cell switching strategy for an LTE-Advanced system based on the carrier aggregation technology.

Example processing flow 500 includes one or more operations, actions, or functions as illustrated by one or more of blocks 502, 504, 510 and 512 and sub-blocks 506 and 508. Although illustrated as discrete blocks, various blocks may be divided into additional blocks, combined into fewer blocks, or eliminated, depending on the desired implementation. Further, processing flow 500 may be implemented in the first base station 110, the second base station 120, a central office associated with the first base station 110 and the second base station 120, and/or the example computing device 600. Processing flow 500 may begin at block 502.

Block 502 (Monitor Channel Conditions Of A Plurality Of Component Carriers) includes monitoring channel conditions of a plurality of component carriers of a first wireless communication cell. For example, the first base station 110 monitors the channel conditions of CC1 and CC2, of cell A 115, which are utilized by user equipment 130 when user equipment 130 is within the coverage range of cell A 115.

Block 504 includes sub-blocks 506 and 508, at least one of which may be performed after block 502.

Sub-block 506 (Release A $1^{st}$ One Of The Plurality Of Component Carriers) includes releasing a first component carrier of the plurality of component carriers of the first wireless communication cell from being utilized by a first communication device while maintaining utilization of a second component carrier of the plurality of component carriers of the first wireless communication cell by the first communication device in response to a channel condition of the first component carrier of the first wireless communication cell being less than a channel condition of a first component carrier of a second wireless communication cell. For example, the first base station 110 releases CC1 of cell A 115 from being utilized by user equipment 130 while maintaining utilization of CC2 of cell A 115 by user equipment 130 in response to the channel condition of CC1 of cell A 115 being less than the channel condition of CC1 of cell B 125.

Sub-block 508 (Allocate A $3^{rd}$ One Of The Plurality Of Component Carriers) includes allocating a third component carriers of the plurality of component carriers of the first wireless communication cell for utilization by a second communication device as a third component carrier of the second wireless communication cell is released from being utilized by the second communication device in response to a channel condition of the third component carrier of the first wireless communication cell being greater than a channel condition of the third component carrier of the second wireless communication cell. For example, the first base station 110 allocates CC3 (not shown) of cell A 115 to be utilized by a second user equipment (not shown) in response to the channel condition of CC3 of cell A 115 being less than the channel condition of CC3 (not shown) of cell B 125. This occurs when the second user equipment moves away from cell B 125 and toward cell A 115.

In at least some embodiments, the operation of releasing a first component carrier of the plurality of component carriers of the first wireless communication cell from being utilized by a first communication device while maintaining utilization of a second component carrier of the plurality of component carriers of the first wireless communication cell by the first communication device may include: (1) releasing the first component carrier of the first wireless communication cell from being utilized by the first communication device as a primary component carrier with respect to the first wireless communication cell while maintaining utilization of the second component carrier of the first wireless communication cell by the communication device; and (2) allocating the second component carrier of the first wireless communication cell as the primary component carrier for the communication device with respect to the first wireless communication cell. For example, after releasing CC1 of cell A 115 from being utilized by user equipment 130 in response to the channel condition of CC1 of cell A 115 being less than the channel condition of CC1 of cell B 125, the first base station 110 allocates CC2 as the PCC for user equipment 130 with respect to cell A 115.

In at least some embodiments, the first component carrier of the second wireless communication cell may be allocated as a primary component carrier for the communication device with respect to the second wireless communication cell. For example, the second base station 120 may allocate CC1 of cell B 125 as the PCC for user equipment 130 with respect to cell B 125.

In at least some embodiments, the operation of releasing a first component carrier of the plurality of component carriers of the first wireless communication cell from being utilized by a first communication device while maintaining utilization of a second component carrier of the plurality of component carriers of the first wireless communication cell by the first communication device may include releasing the first component carrier of the first wireless communication cell from being utilized by the first communication device as a secondary component carrier with respect to the first wireless communication cell while maintaining utilization of the second component carrier of the first wireless communication cell by the communication device as a primary component carrier with respect to the first wireless communication cell. For example, initially CC1 of cell A 115 may be the SCC and CC2 of cell A 115 may be the PCC, and when the first base station 110 releases CC1 of cell A 115 from being utilized by user equipment 130 while maintaining utilization of CC2 of cell A 115 by user equipment 130, the first base station 110 releases CC1 as the SCC and maintains CC2 as the PCC with respect to cell A 115. In at least some embodiments, in processing flow 500 the first component carrier of the second wireless communication cell is allocated as a primary component carrier for the communication device with respect to the second wireless communication cell. For example, the second base station 120 may allocate CC1 of cell B 125 as the PCC for user equipment 130 with respect to cell B 125.

In at least some embodiments, Block 510 (Release A $2^{nd}$ One of the Plurality of Component Carriers) includes releasing the second component carrier of the plurality of component carriers of the first wireless communication cell from being utilized by the first communication device in response to a channel condition of the second component carrier of the first wireless communication cell being less than a channel condition of a second component carrier of the second wireless communication cell. For example, after releasing CC1 of cell A 115 from being utilized by user equipment 130 in response to the channel condition of CC1 of cell A 115 being less than the channel condition of CC1 of cell B 125, the first base station 110 releases CC2 of cell A 115 from being utilized by user equipment 130 in response to the channel condition of CC2 of cell A 115 being less than the channel condition of CC2 of cell B 125.

In at least some embodiments, Block 512 (Allocate A $4^{th}$ One of the Plurality of Component Carriers) includes allocating a fourth component carriers of the plurality of component carriers of the first wireless communication cell for utilization by the second communication device as a fourth component carrier of the second wireless communication cell is released from being utilized by the second communication device in response to a channel condition of the fourth component carrier of the first wireless communication cell being greater than a channel condition of the fourth component carrier of the second wireless communication cell. For example, after allocating CC3 of cell A 115 to be utilized by the second user equipment in response to the channel condition of CC3 of A 115 being greater than the channel condition of CC3 of cell B 125, the second base station 120 further allocates CC4 (not shown) of cell A 115 to be utilized by the user equipment in response to the channel condition of CC4 of A 115 being greater than the channel condition of CC4 (not shown) of cell B 125.

The cell switching strategy described herein monitors channel conditions of the component carriers of neighboring cells. Rather than switching all of the component carriers utilized by a user equipment from one cell to another regardless of the channel condition of each of the component carriers between the two cells in concern, the cell switching strategy calls for switching a component carrier from an original cell to a new cell in response to the channel condition of the component carrier of the new cell being greater than that of the original cell. On the other hand, the cell switching strategy maintains a component carrier with the original cell in response to the channel condition of the component carrier of the original cell being greater than that of the new cell. Resultantly, the user equipment transmits signals using component carriers with better channel condition. This improves the system performance during the cell switching. Moreover, as the number of component carriers of each cell is reduced and the transmission power of each component carrier is increased, system performance is further improved. Accordingly, better user experience can be achieved as a user can enjoy a higher system capacity with smooth data communication.

Exemplary Computing Device

FIG. 6 shows an example computing device 600 that is configured to implement operations of one or more embodiments of a cell switching strategy for an LTE-Advanced system based on the carrier aggregation technology.

It will be readily appreciated that the techniques disclosed herein may be implemented in other computing devices, systems, and environments. The computing device 600 shown in FIG. 6 is one example of a computing device and is not intended to suggest any limitation as to the scope of use or functionality of the computer and network architectures.

In at least one implementation, computing device 600 typically includes at least one processing unit 602 and system memory 604. Depending on the exact configuration and type of computing device, system memory 604 may be volatile (such as RAM), non-volatile (such as ROM, flash memory, etc.) or some combination thereof. System memory 604 may include an operating system 606, one or more program modules 608, and may include program data 610. A basic implementation of the computing device 600 is demarcated by a dashed line 614. In at least one embodiment, computing device 600 may be a part of the first base station 110, the second base station 120 and/or a central office associated with the first base station 110 and the second base station 120. In at least another embodiment, computing device 600 may be a computing device that is communicatively coupled to the first base station 110, the second base station 120 and/or a central office associated with the first base station 110 and the second base station 120.

The program module 608 may include a module 612 configured to implement the cell switching strategy for an LTE-Advanced system based on the carrier aggregation technology as described above. For example, the module 612 include a set of computer-executable instructions or program codes that, when executed by the processing unit 602, may cause the processing unit 602 to carry out processing flows 200, 300, 400 and/or 500, and any variations thereof, e.g., the computing device 600 performing the operations as described above with respect to processing flows 200, 300, 400 and/or 500.

Computing device 600 may have additional features or functionality. For example, computing device 600 may also include additional data storage devices such as removable storage 616 and non-removable storage 618. In at least some implementations, the removable storage 616 and non-removable storage 618 are an example of computer accessible media for storing computer-executable instructions or program codes that are executable by the processing unit 602 to perform the various functions described above. Generally, any of the functions described with reference to the figures can be implemented using software, firmware, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store information for access by a computing device, e.g., computing device 600. Any of such computer accessible media may be part of the computing device 600.

In one implementation, the removable storage 616, which is a computer accessible medium, has a set of computer-executable instructions 630 stored thereon. When executed by the processing unit 602, the set of computer-executable instructions 630 cause the processing unit 602 to execute operations, tasks, functions and/or methods as described above, including processing flows 200, 300, 400 and/or 500 and any variations thereof.

Computing device 600 may also include one or more input devices 620 such as keyboard, mouse, pen, voice input device, touch input device, etc. Computing device 600 may additionally include one or more output devices 622 such as a display, speakers, printer, etc.

Computing device 600 may also include one or more communication connections 624 that allow the computing device 600 to communicate with apparatus 650 over network connection 628. Apparatus 650 may be the first base station 110, the second base station 120, or a central office associated with the first base station 110 and the second base station 120. In such case, computing device 600 may be a computing device used by an operator to control operations of the first base station 110, the second base station 120, or a central office associated with the first base station 110 and the second base station 120.

Upon executing the set of computer-executable instructions, whether stored in module 612 of program module 608 or in removable storage 616, processing unit 602 may direct computing device 600 or apparatus 650 to carry out a number of operations to implement the cell switching strategy for an LTE-Advanced system based on the carrier aggregation technology as described above, including processing flows 200, 300, 400 and/or 500 and any variations thereof.

It is appreciated that the illustrated computing device 600 is one example of a suitable device and is not intended to suggest any limitation as to the scope of use or functionality of the various embodiments described.

Additional and Alternative Implementation Notes

In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The exemplary processes discussed herein are illustrated as a collection of blocks in a logical flow graph, which represents a sequence of operations that can be implemented with hardware, software, firmware, or any combination thereof. In the context of software/firmware, the blocks represent instructions stored on one or more processor-readable storage media that, when executed by one or more processors, perform the recited operations. The operations of the exemplary processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms "coupled" and "connected" may have been used to describe how various elements interface. Such described interfacing of various elements may be either direct or indirect.

I claim:

1. A method, comprising:
   monitoring channel conditions of a first component carrier and a second component carrier of a first wireless communication cell that are utilized by a communication device as a primary component carrier and a secondary component carrier, respectively, in carrier aggregation in communication with the first wireless communication cell in an LTE-Advanced system;
   releasing the first component carrier from being utilized by the communication device in communication with the first wireless communication cell while maintaining utilization of the second component carrier by the communication device in communication with the first wireless communication cell, in response to a channel condition of the first component carrier of the first wireless communication cell being less than a channel condition of a corresponding first component carrier of a second wireless communication cell; and
   allocating the second component carrier as the primary component carrier for the communication device in communication with the first wireless communication cell, and allocating the first component carrier of the second wireless communication cell as a primary component carrier for the communication device in communication with the second wireless communication cell,
   wherein utilization by the communication device of the first component carrier as the primary component carrier in communication with the second wireless communication cell is concurrent with utilization by the communication device of the second component carrier as the primary component carrier in communication with the first wireless communication cell.

2. A method, comprising:
   monitoring channel conditions of a plurality of component carriers of a first wireless communication cell that are not utilized by a communication device in an LTE-Advanced system;
   allocating a first component carrier of the plurality of component carriers of the first wireless communication cell for utilization by the communication device in communication with the first wireless communication cell, in accordance with a first component carrier of a second wireless communication cell being released from utilization by the communication device in communication with the second wireless communication cell in response to a channel condition of the first component carrier of the plurality of component carriers of the first wireless communication cell being greater than a channel condition of the first component carrier of the second wireless communication cell; and
   allocating the first component carrier of the plurality of component carriers of the first wireless communication cell as a primary component carrier for utilization by the communication device in communication with the first wireless communication cell,
   wherein utilization by the communication device of a second component carrier of the second wireless communication cell as a primary component carrier in communication with the second wireless communication cell is concurrent with utilization by the communication device of the first component carrier of the plurality of component carriers of the first wireless communication cell as the primary component carrier in communication with the first wireless communication cell.

3. The method as recited in claim 2, further comprising:
   allocating a second component carrier of the plurality of component carriers of the first wireless communication cell for utilization by the communication device in accordance with the second component carrier of the second wireless communication cell being released from utilization by the communication device in response to a channel condition of the second component carrier of the plurality of component carriers being greater than a channel condition of the second component carrier of the second wireless communication cell.

4. The method as recited in claim 3, wherein the allocating the second component carrier of the plurality of component carriers of the first wireless communication cell for utilization by the communication device comprises allocating the second component carrier of the plurality of component carriers of the first wireless communication cell as a secondary component carrier for utilization by the communication device in communication with the first wireless communication cell.

5. A non-transitory computer-readable medium storing instructions that, when executed, cause one or more processors to perform operations comprising:
   monitoring channel conditions of a plurality of component carriers of a first wireless communication cell in an LTE-Advanced system,
      wherein a first component carrier of the plurality of component carriers is utilized by a communication device as a primary component carrier in communication with the first wireless communication cell, and
      wherein a second component carrier of the plurality of component carriers is utilized by the communication device as a secondary component carrier in communication with the first wireless communication cell;
   monitoring channel conditions of a plurality of component carriers of a second wireless communication cell; and
   switching from the first component carrier of the first wireless communication cell to a corresponding first component carrier of the plurality of component carriers of the second wireless communication cell while maintaining utilization of the second component carrier of the first wireless communication cell by the communication device in communication with the first wireless communication cell in response to a channel condition of the first component carrier of the first wireless communication cell being less than a channel condition of the first component carrier of the second wireless communication cell, wherein the switching comprises:

releasing the first component carrier from being utilized by the communication device in communication with the first wireless communication cell while maintaining utilization of the second component carrier by the communication device in communication with the first wireless communication cell in response to a channel condition of the first component carrier of the first wireless communication cell being less than a channel condition of the first component carrier of the second wireless communication cell, allocating the second component carrier as a primary component carrier for the communication device in communication with the first wireless communication cell, and allocating the first component carrier of the second wireless communication cell as a primary component carrier for the communication device in communication with the second wireless communication cell, and wherein utilization by the communication device of the first component carrier of the second wireless communication cell as the primary component carrier in communication with the second wireless communication cell is concurrent with utilization by the communication device of the second component carrier as the primary component carrier in communication with the first wireless communication cell.

6. The non-transitory computer-readable medium as recited in claim 5, wherein the switching from the first component carrier of the first wireless communication cell to the first component carrier of the second wireless communication cell while maintaining utilization of the second component carrier of the first wireless communication cell by the communication device comprises:

releasing the second component carrier from being utilized by the communication device in communication with the first wireless communication cell while maintaining utilization of the first component carrier by the communication device in communication with the first wireless communication cell in response to a channel condition of the second component carrier of the first wireless communication cell being less than a channel condition of a corresponding second component carrier of the second wireless communication cell; and maintaining the first component carrier as the primary component carrier for the communication device in the communication with the first wireless communication cell.

7. The non-transitory computer-readable medium as recited in claim 6, further comprising:

allocating the second component carrier of the second wireless communication cell as the primary component carrier for the communication device in communication with the second wireless communication cell.

8. The non-transitory computer-readable medium as recited in claim 5, wherein the operations further comprise:

further switching from the second component carrier of the first wireless communication cell to the second component carrier of the second wireless communication cell in response to a channel condition of the second component carrier of the first wireless communication cell being less than a channel condition of the second component carrier of the second wireless communication cell.

9. An apparatus, comprising:

a memory in which a set of processor-executable instructions is stored; and a processor coupled to the memory, upon executing the set of processor-executable instructions the processor performing operations comprising:

monitoring channel conditions of a plurality of component carriers of a first wireless communication cell in an LTE-Advanced system; and releasing a first component carrier of the plurality of component carriers of the first wireless communication cell from being utilized as a primary component carrier by a first communication device in communication with the first wireless communication cell while maintaining utilization of a second component carrier of the plurality of component carriers of the first wireless communication cell by the first communication device in communication with the first wireless communication cell in response to a channel condition of the first component carrier of the first wireless communication cell being less than a channel condition of a first component carrier of a second wireless communication cell, wherein the releasing comprises allocating the second component carrier of the first wireless communication cell as the primary component carrier for the first communication device in communication with the first wireless communication cell and wherein the first component carrier of the second wireless communication cell is allocated as a primary component carrier for the communication device in communication with the second wireless communication cell, and wherein utilization by the communication device of the first component carrier of the second wireless communication cell as the primary component carrier in communication with the second wireless communication cell is concurrent with utilization by the communication device of the second component carrier as the primary component carrier in communication with the first wireless communication cell.

10. The apparatus as recited in claim 9, wherein the releasing a first component carrier of the plurality of component carriers of the first wireless communication cell from being utilized by a first communication device in communication with the first wireless communication cell while maintaining utilization of a second component carrier of the plurality of component carriers of the first wireless communication cell by the first communication device in communication with the first wireless communication cell comprises:

releasing the first component carrier of the first wireless communication cell from being utilized by the first communication device as a secondary component carrier in communication with the first wireless communication cell while maintaining utilization of the second component carrier of the first wireless communication cell by the first communication device as a primary component carrier in communication with the first wireless communication cell.

11. The apparatus as recited in claim 10, wherein the first component carrier of the second wireless communication cell is allocated as the primary component carrier for the communication device in communication with the second wireless communication cell.

12. The apparatus as recited in claim 9, wherein upon executing the set of processor-executable instructions the processor further performs operations comprising:

releasing the second component carrier of the plurality of component carriers of the first wireless communication cell from being utilized by the first communication device in communication with the first wireless communication cell in response to a channel condition of the second component carrier of the first wireless communication cell being less than a channel condition of a second component carrier of the second wireless communication cell.

13. The apparatus as recited in claim 9, wherein upon executing the set of processor-executable instructions the processor further performs operations comprising:

allocating a fourth component carrier of the plurality of component carriers of the first wireless communication cell for utilization by a second communication device in communication with the first wireless communication cell in accordance with a fourth component carrier of the second wireless communication cell being released from utilization by the second communication device in communication with the first wireless communication cell in response to a channel condition of the fourth component carrier of the first wireless communication cell being greater than a channel condition of the fourth component carrier of the second wireless communication cell.

14. The apparatus as recited in claim 9, wherein upon executing the set of processor-executable instructions the processor further performs operations comprising:

allocating a third component carrier of the plurality of component carriers of the first wireless communication cell for utilization by a second communication device in accordance with a third component carrier of the second wireless communication cell being released from utilization by the second communication device in response to a channel condition of the third component carrier of the first wireless communication cell being greater than a channel condition of the third component carrier of the second wireless communication cell.

* * * * *

UNITED STATES PATENT AND TRADEMARK OFFICE
CERTIFICATE OF CORRECTION

PATENT NO. : 9,282,498 B2
APPLICATION NO. : 13/989656
DATED : March 8, 2016
INVENTOR(S) : Anpeng Huang It is certified that error appears in the above-identified patent and that said Letters Patent is hereby corrected as shown below:

Specification:

In Column 1, Line 9, delete "§371" and insert -- § 371 --, therefor.

In Column 3, Line 41, delete "User 130" and insert -- User equipment 130 --, therefor.

In Column 8, Line 5, delete "CC1 of B 125" and insert -- CC1 of cell B 125 --, therefor.

In Column 8, Line 6, delete "CC1 of cell B 115" and insert -- CC1 of cell A 115 --, therefor.

In Column 12, Line 13, delete "CC3 of A" and insert -- CC3 of cell A --, therefor.

In Column 12, Line 17, delete "CC4 of A 115" and insert -- CC4 of cell A 115 --, therefor.

Signed and Sealed this
Twelfth Day of July, 2016

Michelle K. Lee
*Director of the United States Patent and Trademark Office*